No. 790,068. PATENTED MAY 16, 1905.
A. E. MITCHELL.
CULINARY IMPLEMENT.
APPLICATION FILED NOV. 19, 1904.

Witnesses
Inventor
Alta E. Mitchell
By
Chandler & Chandler Attorneys

No. 790,068. Patented May 16, 1905.

UNITED STATES PATENT OFFICE.

ALTA E. MITCHELL, OF JOHNSONBURG, PENNSYLVANIA.

CULINARY IMPLEMENT.

SPECIFICATION forming part of Letters Patent No. 790,068, dated May 16, 1905.

Application filed November 19, 1904. Serial No. 233,432.

*To all whom it may concern:*

Be it known that I, ALTA E. MITCHELL, a citizen of the United States, residing at Johnsonburg, in the county of Elk, State of Pennsylvania, have invented certain new and useful Improvements in Culinary Implements; and I do hereby declare the following to be a full, clear, and exact description of the invention, such as will enable others skilled in the art to which it appertains to make and use the same.

This invention relates to culinary implements, and more particularly to combination implements, and has for its object to provide a device of this nature which will combine a cake-turner and a griddle-greaser in a single implement, the arrangement being such that the griddle is greased when the cakes are turned or lifted therefrom.

A further object is to provide an implement embodying these features which may be stamped from a single piece of metal, and thus manufactured at an extremely low figure.

Other objects and advantages will be apparent from the following description, and it will be understood that modifications of the specific construction shown may be made and any suitable materials may be used without departing from the spirit of the invention.

Figure 1:
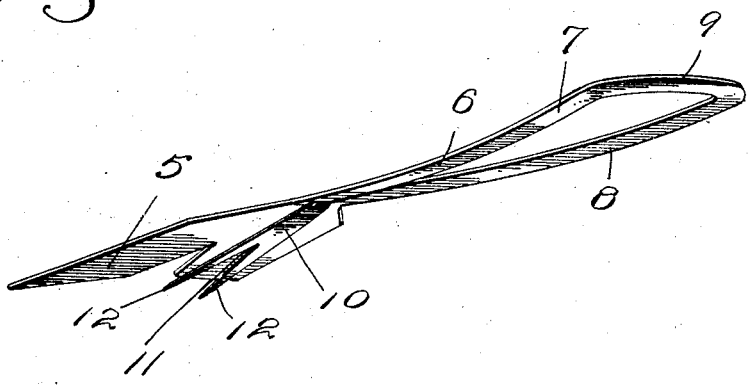
Figure 2:
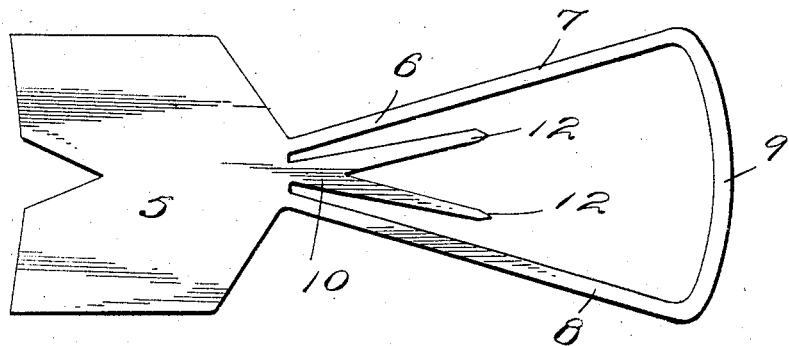

In the drawings forming a portion of this specification, and in which like numerals of reference indicate similar parts in both views, Figure 1 is a perspective view of the invention. Fig. 2 is a plan view of the blank from which the implement is formed.

Referring now to the drawings, the present invention comprises a blade 5, having a handle 6 extending upwardly at a slight angle from its rearward edge. This handle consists of spaced portions 7 and 8, which join the blade at their forward ends and which are connected at their rearward ends by means of a transverse portion 9. A wedge-shaped finger 10 is connected at its minor end to the rearward edge of the blade, between the portions 7 and 8, and is provided with a V-shaped notch 11 in its free edge, resulting in spaced diverging tines 12, which are sharpened, as illustrated. The finger 10 is turned downwardly and extends forwardly at an angle beneath the blade 5.

In forming the implement all the portions thereof are stamped from a single piece of sheet metal, as illustrated in Fig. 2, after which the handle 6 and finger 10 are bent into the correct positions.

In use a piece of material with which a griddle is to be greased is engaged with the tines 12, and it will be apparent that when a cake is turned or lifted the greasing material will come into engagement with the surface of the griddle, so that it is not necessary to use a separate instrument for greasing purposes.

What is claimed is—

1. In a device of the class described the combination with a cake-turning blade, of a grease-holding device connected with the blade and extending at an angle therebeneath, said grease-holding device being arranged to deposit grease on a surface with which the blade is engaged.

2. A device of the class described comprising a blade, a handle, and a grease-holding device, said grease-holding device being formed integral with the blade and arranged to deposit grease on a surface with which the blade is engaged.

3. A device of the class described, comprising a blade, a handle connected with the blade, and a finger extending at an angle beneath the blade from the rearward edge thereof, said finger being arranged to receive and hold grease.

4. A device of the class described comprising a blade, a handle comprising spaced portions, and a portion connected with the spaced portions at one end thereof, said spaced portions being connected at their remaining ends to the rearward edge of the blade, and a finger including spaced tines connected with the rearward edge of the blade between the spaced portion of the handle and extending beneath the blade at an angle thereto.

5. As an article of manufacture, a device of the class described, formed from a single blank including a blade and a handle, said handle comprising a yoke connected at its ends with the blade and a member including spaced tines connected with the blade portion and extending into the inclosure of the yoke, said member being bent to extend at an angle beneath the blade to form a grease-holding device.

In testimony whereof I affix my signature in presence of two witnesses.

ALTA E. MITCHELL.

Witnesses:
 EDNA YOUNGER,
 CLINTON JONES.